(12) United States Patent
Houseman et al.

(10) Patent No.: US 6,685,245 B1
(45) Date of Patent: Feb. 3, 2004

(54) TRUCK GRILLE GUARD MOUNTING BRACKET

(75) Inventors: Terrance Lane Houseman, Jetmore, KS (US); Merrill Lee Cauble, Larned, KS (US); Lonnie Ray Martin, II, Halstead, KS (US); Michael Lee McCoy, Wichita, KS (US)

(73) Assignee: Kritter Gitter, Inc., Jetmore, KS (US)

( * ) Notice: Subject to any disclaimer, the term of this patent is extended or adjusted under 35 U.S.C. 154(b) by 0 days.

(21) Appl. No.: 10/194,671

(22) Filed: Jul. 12, 2002

(51) Int. Cl.$^7$ .............................................. B60R 19/52
(52) U.S. Cl. ...................... 293/115; 293/118; 293/144; 293/145; 293/147; 293/155
(58) Field of Search .............................. 293/38, 39, 114, 293/118, 129, 131, 132, 135, 138, 139, 140, 115, 142, 143, 144, 145, 146, 147, 148, 152, 153, 154, 155; 52/633; D12/171, 170; 180/89.17; 280/770

(56) References Cited

U.S. PATENT DOCUMENTS

| | | | | |
|---|---|---|---|---|
| 1,656,026 A | * | 1/1928 | Walter | 293/138 |
| 3,282,368 A | * | 11/1966 | Pittera | 293/115 |
| 3,993,229 A | * | 11/1976 | Summers | 293/118 |
| 4,099,760 A | * | 7/1978 | Mascotte et al. | 293/115 |
| 4,125,214 A | * | 11/1978 | Penn | 293/117 |
| 4,469,360 A | * | 9/1984 | Drury | 293/144 |
| 6,447,032 B1 | * | 9/2002 | Howell, Sr. | 293/115 |

OTHER PUBLICATIONS

Japanese Patent No. 06305381A issued Jan. 11, 1994 to applicant, Suzuki Motor Corp., inventor Yamaguchi Masaaki.

U.S. patent No. 5,683,128 issued Nov. 4, 1997 to Heyns.

German Patent No. DE 3518899 A1 issued Nov. 27, 1986.

U.S. patent No. 6,737,885 issued Jun. 10, 1997 to Hummel.

U.S. patent No. 5,067,760 issued Nov. 26, 1991 to Moore, et al.

U.S. patent No. 4,657,294 issued Apr. 14, 1987 to Rumpp.

U.S. patent No. 4,099,760 issued Jul. 11, 1978 to Mascotte, et al.

U.S. patent No. 3,749,436 issued Jul 31, 1973 to Hitchcock.

U.S. patent No. 3,287,027 issued Nov. 22, 1966 to Schuckman.

Canadian Patent Application No. CA2159968 filed Feb. 28, 2002 by Bartley (inventor) & RW & AM Bartley Ltd. (owners).

* cited by examiner

*Primary Examiner*—Dennis H. Pedder
*Assistant Examiner*—Jason Morrow
(74) *Attorney, Agent, or Firm*—Kenneth H. Jack; Davis & Jack, LLC

(57) ABSTRACT

A truck grille guard mounting bracket consisting of a first laterally elongated clevis having front and rear arms, the front arm being adapted for fixed attachment to a truck bumper, the rear arm being adapted for fixed attachment to truck spring hangers, truck chassis members, or to a truck tow hook arm; the distal end of the rear arm of the first laterally elongated clevis forming a plurality of second devises, each second clevis being adapted for nesting receipt of and fixed attachment to truck chassis members or to truck spring hangers; and a plurality of third devises extending forwardly from the front arm of the first laterally elongated clevis, the second clevis being adapted for support of and pivoting attachment of a truck grille guard.

7 Claims, 3 Drawing Sheets

TRUCK GRILLE GUARD MOUNTING BRACKET

CROSS REFERENCE TO RELATED APPLICATIONS

The applicants herein have contemporaneously filed related applications entitled Impact Absorbing Truck Grille Guard and Articulation Controlling Apparatus.

FIELD OF THE INVENTION

This invention relates to highway trucks. More particularly, this invention relates to structure and apparatus adapted for attachment to truck front end bumper and chassis structures for support of truck grille guards.

BACKGROUND OF THE INVENTION

Common configurations of heavy trucks and truck-tractors impose multiple demands upon the design of brackets intended for mounting of metal radiator protecting guard frames. Such truck's radiator grille cover and rearwardly lying radiator are primary structures to be protected by such grille guard. The forward end of a truck's engine cowl occupies the space most advantageously utilized for mounting support of a truck grille guard. However, truck engine cowls, which commonly include a radiator protecting grille cover, are typically constructed of lightweight material and lack the strength necessary for support of a guard frame. Thus, truck grille guards must be mechanically inconveniently supported in a cantilevered fashion in front of a truck's radiator grille cover without utilizing the truck's cowl as structural support.

Mounting of a grille guard in front of a truck's cowl is further complicated by such cowl's capacity for forwardly pivoting for engine access, such pivoting motion extending the cowl through the space which is necessarily occupied by a grille guard. Thus, a grille guard mount, while providing firm cantilevered base support of a grille guard, but must also facilitate either pivoting motion or removal of the grille guard to allow opening of the truck's cowl. Ideally, a grille guard mount facilitates pivoting motion of the grille guard, avoiding inconvenient grille guard assembly and disassembly steps.

The instant inventive truck grille guard provides a solution to design demands outlined above by providing a combination of upwardly opening, rearwardly opening and forwardly opening clevises adapted for nestingly receiving common truck bumper, chassis, and wheel support structures, and adopted for receiving and articulating a metal frame truck grille guard.

BRIEF SUMMARY OF THE INVENTION

The instant inventive truck grille guard mounting bracket comprises a first laterally elongated and upwardly opening clevis having a front arm, and having a rear arm. Preferably, the front arm of said first clevis comprises a flat bumper mounting plate adapted for fixed attachment to the flat front surface of a truck bumper. Suitably, though less desirably, the front arm of the first laterally elongated clevis may comprise a rigid rectangular frame.

The distal end of the rear arm of the first clevis is preferably adapted for fixed attachments to structures which commonly reside immediately to the rear of a truck's bumper, such as truck chassis members, truck spring hangers, or a truck tow hook arm. By securely mounting the distal end of the rearward arm of the first clevis to such common truck structures, and by securely mounting the preferred front arm mounting plate of such clevis to the truck's bumper, the front arm of the first clevis is adapted to serve as a secure base for cantilevered attachment and support of a truck grille guard.

Preferably, the rear arm of the first clevis comprises a plurality of second clevises, each second clevis preferably being adapted for nesting receipt of and fixed attachment to a truck chassis member or to a truck spring hanger.

The instant inventive truck grille guard mounting bracket preferably further comprises a plurality of forwardly opening third clevises, each extending forwardly from the front arm of the first clevis, the third clevises being adapted for pivoting attachment of a lower end of a truck grille guard.

The instant inventive truck grille guard preferably further comprises a plurality of fourth clevises overlying the third devises and similarly extending forwardly from the forward arm of the first clevis, each fourth clevis being adapted for pivoting attachment of a pivot stopping articulating guy or arm, and for securing a grille guard attached as described above, in an upwardly articulated or pivoted impact absorbing position.

Preferably, each clevis among the second, third, and fourth pluralities of devises has a left arm and a right arm, the left and right arms being formed integrally from a plurality of left and right "U" brackets.

Accordingly, it is an object of the present invention to provide a truck grille guard mounting bracket configured as a combination of clevises which are adapted and oriented for secure mounting support of a truck grille guard upon the forward end of a truck, and for facilitating articulating or pivoting motion of such grille guard.

Other and further objects, benefits, and advantages of the present invention will become known to those skilled in the art upon review of the Detailed Description which follows, and upon review of the appended drawings.

DETAILED DESCRIPTION OF A PREFERRED EMBODIMENT

Figure 1:
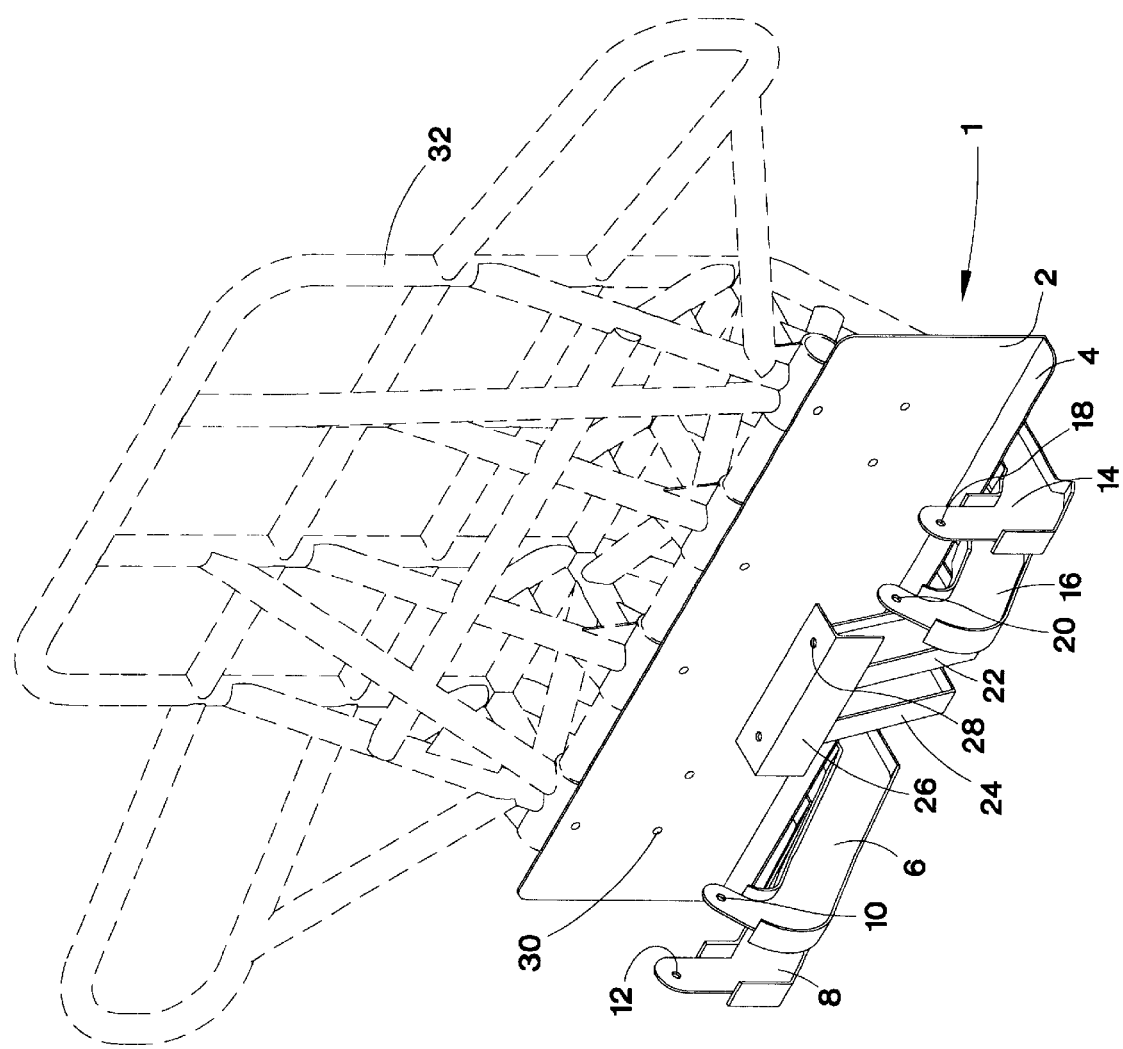
FIG. 1 is an isometric view of the instant inventive truck grille guard mounting bracket.
Figure 2:
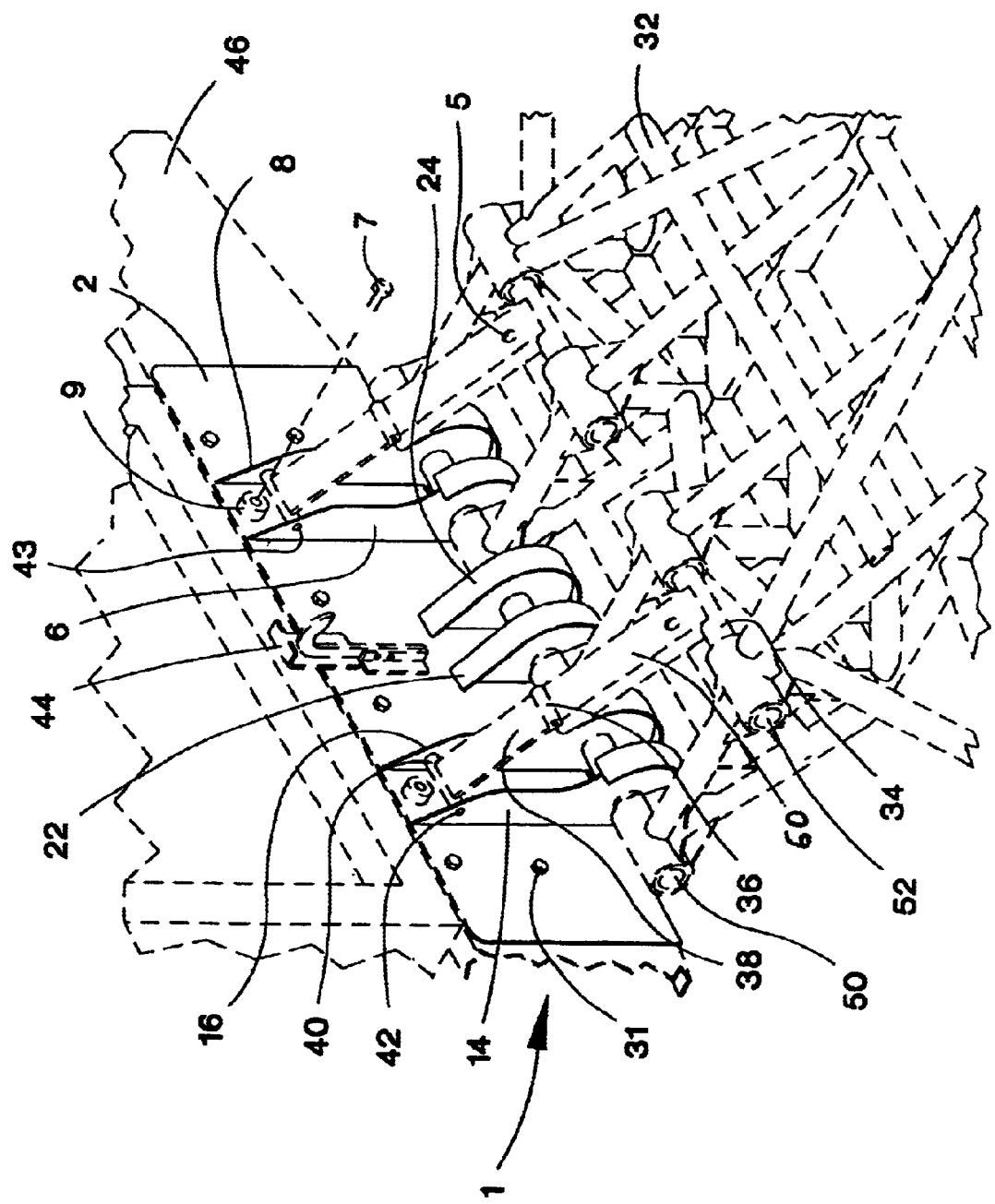
FIG. 2 is a reverse view of the mechanism of FIG. 1, the view showing an attached grille guard in its downwardly articulated or pivoted position.

Referring now to the drawings, and in particular to FIG. 1, the instant inventive truck grille guard mounting bracket is referred to generally by Reference Arrow 1. The mounting bracket preferably has a bumper mounting plate 2. Referring to FIG. 2, mounting plate 2 is preferably fixedly attached to the forward surface of a bumper 46, said attachment preferably being accomplished by means of spirally threaded bolts 31 extending through bolt receiving apertures 30 and received by, referring to FIG. 3, spirally threaded nuts 29. Referring to FIG. 1, the lower end of the bumper mounting plate 2 preferably has a rearwardly turned flange 4, such flange guiding assembly upon truck bumper 46, and providing additional welding surface and rigidity to the mounting bracket structure.

Figure 3:
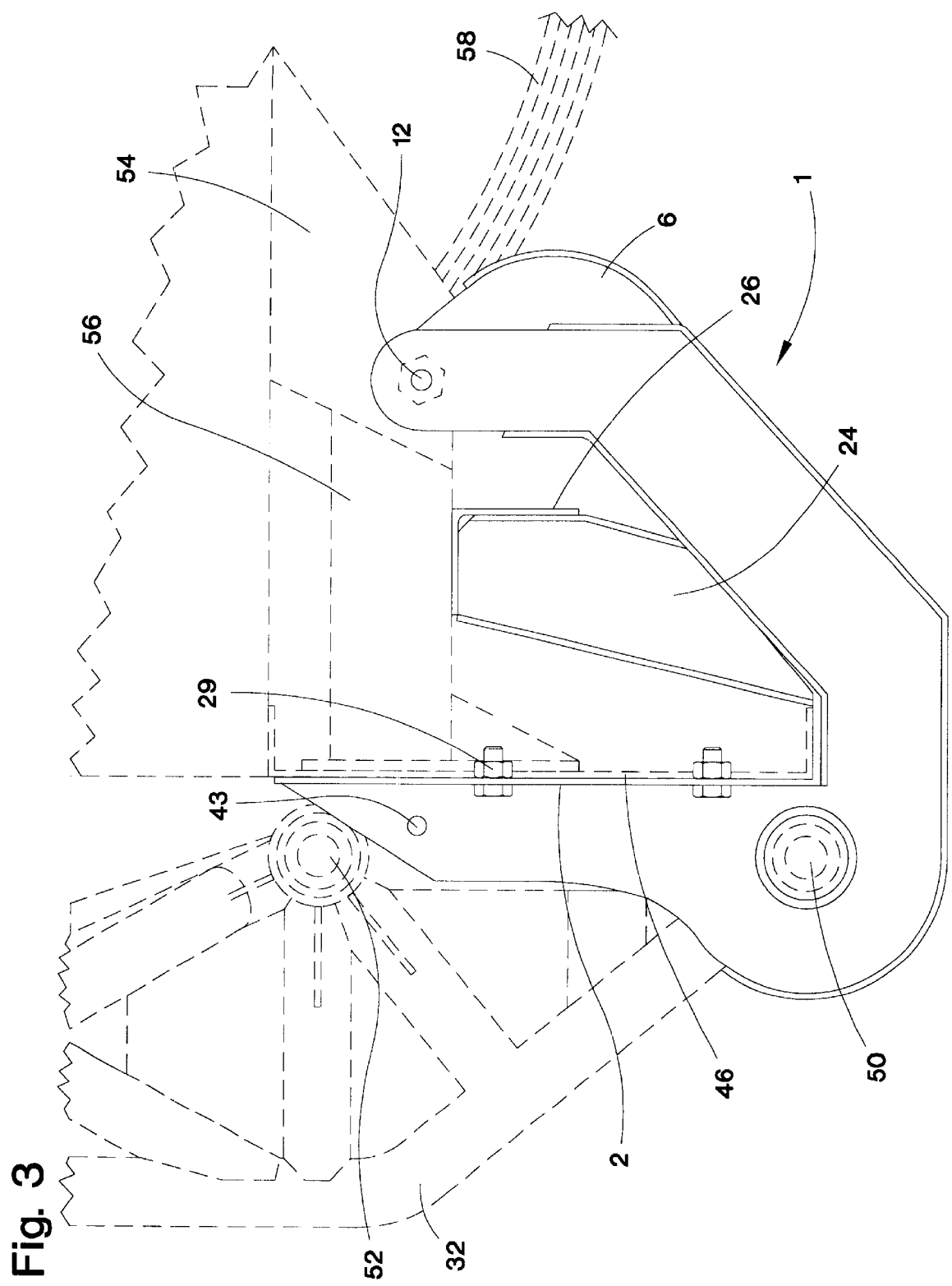
FIG. 3 is a partial side view of the apparatus depicted in FIGS. 1 and 2.

Referring simultaneously to FIGS. 1–3, "U" brackets 6, 8, 14, 16, 22, and 24 are fixedly welded to the forward and lower surfaces of bumper mounting plate 2 and flange 4. For enhancement of structural rigidity, each of the "U" brackets 6, 8, 14, 16, 22, and 24 preferably includes peripherally welded "T" flanges.

Referring simultaneously to FIGS. 1–3, the rearward arms of "U" brackets 6, 8, 14, 16, 22, and 24 cumulatively comprise a rearward arm of a first laterally elongated and upwardly opening clevis, while the forward arms of said "U" brackets in combination with the preferred bumper mounting plate 2 comprises a forward arm of said first clevis. The structures which are grasped or nestingly received by said first clevis comprise truck bumper 46, truck tow hook arm/chassis member 56, and spring hangers and springs 54 and 58. Suitably, other truck front end structures may be conjoined with the arms of the first clevis.

Referring to FIG. 1, the rearward arms of "U" brackets 6, 8, 14, and 16 preferably form second left and right clevises which are adapted for nesting receipt of and secure and fixed attachment to truck chassis members or spring hangers by means of bolts or clevis pins (not depicted) extending laterally through eyes 10, 12, 18, and 20.

Referring further to FIG. 1, where a truck front end structure lying to the rear of a truck's bumper is amenable to nesting receipt between clevis arms, distal ends of "U" bracket arms 22 and 24 may support a simple mounting plate 26, such mounting plate being, referring to FIG. 3, fixedly attached to a structure such as a tow hook arm 56 by means of bolts (not depicted) extending through bolt receiving apertures 28.

Referring to FIG. 2, the forward arms of "U" brackets 6, 8, 14, 16, 22, and 24 preferably form a third plurality of devises extending forwardly and opening forwardly from mounting plate 2. Laterally opposed eyes extending through the arms of said plurality of clevises preferably receives a laterally extending clevis pin 50, said pin pivotally mounting and supporting truck grille guard 32.

Further referring to FIG. 2, upper ends of "U" brackets 6, 8, 14, and 16 preferably form a plurality of fourth devises for articulating or hinged support of upper guy members 38. The upper ends of upper guy members 38 preferably include clevis pin receiving sleeves 40. Right and left hinge or clevis pins 42 and 43 preferably extend laterally through said sleeves 40, forming pin, eye, and clevis joints. Preferably, lower guys 60 are fixedly and pivotally attached to lower ends of upper guys 38 by hinges 36, and preferably lower ends of lower guys 60 are similarly attached to grille guard 32 by axle and sleeve joints 34 and 52.

Upon full flexion of upper and lower guys 38 and 60, bolt receiving apertures 5 align with spirally threaded nuts 9, which are preferably fixedly welded to the forwardly facing surface of bumper mounting plate 2. Upon such flexion, grille guard 32 pivots upwardly and may be locked in its upwardly articulated position by extending spirally threaded bolts 7 through apertures 5 for secure threaded mounting within spirally threaded nuts 9. Auxiliary latch 44 secures grille guard 32 in its up position during manipulation of bolts 7.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

We claim:

1. A truck grille guard mounting bracket comprising a laterally elongated and upwardly opening "U" shaped bracket having front and rear arms defining an upwardly opening truck bumper receiving space, the front arm being adapted for fixed attachment to a truck bumper positioned within the upwardly opening truck bumper receiving space, the rear arm being adapted for fixed attachment to truck spring hangers, truck chassis members, or to a truck tow hook arm.

2. The truck grille guard mounting bracket of claim 1 wherein the rear arm of the laterally elongated and upwardly opening "U" shaped bracket comprises a plurality of first clevises, each first clevis being adapted for nesting receipt of and fixed attachment to a truck chassis member or to a truck spring hanger.

3. A truck grille guard mounting bracket comprising a laterally elongated and upwardly opening "U" shaped bracket having front and rear arms, the front arm being adapted for fixed attachment to a truck bumper, the rear arm being adapted for fixed attachment to truck spring hangers, truck chassis members, or to a truck tow hook arm, the rear arm of the laterally elongated and upwardly opening "U" shaped bracket comprising a plurality of first clevises, each first clevis being adapted for nesting receipt of and fixed attachment to a truck chassis member or to a truck spring hanger and further comprising a plurality of second clevises extending forwardly from the front arm of the laterally elongated and upwardly opening "U" shaped bracket, the second clevises being adapted for pivoting attachment of a truck grille guard.

4. The truck grille guard mounting bracket of claim 3 further comprising a plurality of third clevises overlying the second clevises and extending forwardly from the front arm of the laterally elongated and upwardly opening "U" shaped bracket, each third clevis being adapted for fixed attachment of a pivot stopping guy.

5. The truck grille guard mounting bracket of claim 4 wherein each clevis among the first, second, and third pluralities of clevises, has left and right arms, the left and right arms respectively integrally comprising pluralities of left and right "U" sub-brackets.

6. The truck grille guard mounting bracket of claim 5 wherein each clevis among the plurality of first devises comprises laterally opposed clevis pin receiving eyes.

7. The truck grille guard mounting bracket of claim 6 wherein the front arm of the laterally elongated and upwardly opening "U" shaped bracket comprises a truck bumper mounting plate.

* * * * *